US012756634B2

(12) United States Patent
Guagliata

(10) Patent No.: US 12,756,634 B2
(45) Date of Patent: Oct. 6, 2026

(54) FACILITATING INTEGRATION OF PHYSICAL NETWORK ELEMENTS WITHIN VIRTUAL NETWORK SIMULATIONS

(71) Applicant: Cisco Technology, Inc., San Jose, CA (US)

(72) Inventor: Justin G. Guagliata, Saint Louis, MO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 206 days.

(21) Appl. No.: 18/413,191

(22) Filed: Jan. 16, 2024

(65) Prior Publication Data

US 2025/0233798 A1 Jul. 17, 2025

(51) Int. Cl.
*H04L 41/14* (2022.01)

(52) U.S. Cl.
CPC .................................. *H04L 41/145* (2013.01)

(58) Field of Classification Search
None
See application file for complete search history.

(56) References Cited

U.S. PATENT DOCUMENTS

RE40,866 E * 8/2009 Fung ..................... G06F 1/3215 713/323
2008/0019067 A1* 1/2008 Reynolds ................ G06F 1/266 361/93.1
2010/0100767 A1* 4/2010 Liu ......................... H04L 43/50 714/E11.178
2019/0258754 A1 8/2019 Minwalla et al.
2020/0106676 A1 4/2020 Duda et al.
2021/0089239 A1 3/2021 Liguori et al.
2021/0240240 A1 8/2021 Koenen et al.

FOREIGN PATENT DOCUMENTS

CN 116027684 A 4/2023

* cited by examiner

*Primary Examiner* — Fadi Haj Said
(74) *Attorney, Agent, or Firm* — Edell, Shapiro & Finnan, LLC

(57) ABSTRACT

Provided herein are techniques that may facilitate integration of physical devices with virtual network simulations. In one example, a method is provided that may include obtaining, by a network simulation controller, user inputs for configuring a bridge device interconnected with the network simulation controller for each of: a serial hardware interface element that provides serial interconnectivity with one or more physical network devices; an ethernet hardware interface element that provides ethernet connectivity with the one or more physical network devices; and a power distribution element that is to provide electrical power for the one or more physical network devices; and facilitating operation of at least one physical network device of the one or more physical network devices within a virtual network simulation.

20 Claims, 6 Drawing Sheets

FACILITATING INTEGRATION OF PHYSICAL NETWORK ELEMENTS WITHIN VIRTUAL NETWORK SIMULATIONS

TECHNICAL FIELD

The present disclosure relates to network simulation tools and services.

BACKGROUND

When within a virtual simulated network environment, it is often desirable to simulate or emulate the operation of physical devices within the simulated environment using virtual representations of the physical devices. However, feature parity between virtual representations of physical devices is limited. Thus, it can be difficult to fully simulate the actual operational behavior of physical devices for which feature parity is limited within network simulations.

DETAILED DESCRIPTION

Overview

Figure 1:
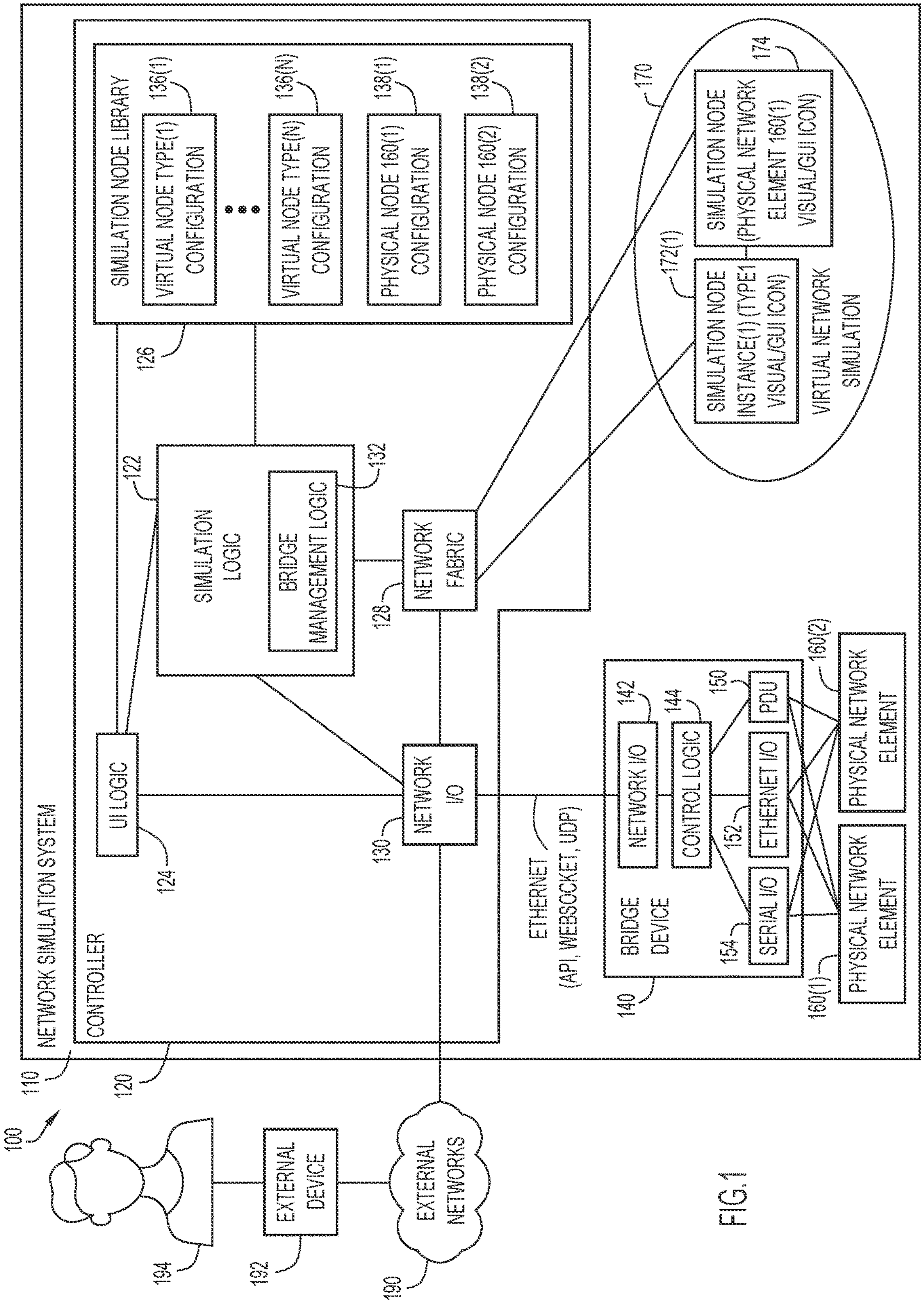
FIG. 1 is a block diagram of a system that may be implemented to facilitate the integration of physical network elements within a virtual network simulation using a bridge device, according to an example embodiment.

Embodiments herein may provide techniques for augmenting virtual network topologies to include physical network devices that can be operated within virtual network simulations to facilitate testing of real-world scenarios on real, physical network equipment. In at least one embodiment, a physical bridge device interconnected with a controller of a network simulation system can be provided in which the physical bridge device may provide physical to virtual bridging capabilities between virtual network simulation nodes operated in one or more virtual network simulations and physical devices operated via the bridge device. Further, in-band control/operation of the bridge device can be provided via the controller of the network simulation system in accordance with embodiments herein.

For example, in at least one embodiment, a network simulation system may be provided that may include a bridge device comprising: a serial hardware interface element that provides serial interconnectivity with one or more physical network devices; a first ethernet hardware interface element that provides ethernet connectivity with the one or more physical network devices; a second ethernet hardware interface element that provides ethernet connectivity with a network simulation controller; and a power distribution element that provides electrical power that is to provide electrical power to the one or more physical network devices. The network simulation controller may operate to facilitate configuration and operation of the one or more physical network devices within at least one network simulation provided via the network simulation system.

Example Embodiments

Network simulation tools provide for the ability to simulate behaviors of both overall operation of a (simulated) network configuration as well as behavior of (simulated) network devices included in the network configuration. When working with network devices inside of a simulated network, a user can connect simulated network devices together with each other within the simulated network and, in some instances, may desire to connect to the simulated network devices via an external network for operational purposes (e.g., for network management purposes, for device management purposes, etc.).

Generally, simulated network devices can be configured as virtual representations of actual physical devices that may be utilized within a physical network. While such virtual representations may generally operate in a manner similar to the physical devices that they are modeled after, it can often be difficult to configure a virtual representation of a physical device with full feature parity to the physical device. That is, there may be some features, operations, etc. offered by the physical device that may not be fully implemented or provided through the virtual representation/network simulation device on which the virtual representation/network simulation device is modeled. As such, it may be desirable to interconnect a physical device to be used within a virtual network simulation in some instances.

In some instances, an external connector can be utilized to provide an interconnection between virtual devices inside a virtual network simulation and physical devices outside the virtual network simulation; however, such external connectors typically involve the use of physical devices that can be both expensive and, more importantly, cannot be natively managed from within a virtual network simulation environment. The configuration of an external connector and physical devices interconnected with the external connector for operation within a virtual network simulation typically involves the use of an out-of-band mechanism/tool that is operated/managed outside of the virtual network simulation environment, which can be expensive and can also add complexities and/or impediments to the process of configuring, managing, and/or operating one or more virtual network simulations configured within the simulation environment.

In order to address such issues, embodiments herein provide for a physical bridge device that can be implemented within a virtual network simulation environment such that the physical bridge device is natively integrated into the virtual network simulation environment such that it can be configured in-band within the simulation environment and can operate to provide a physical to virtual bridging capabilities between virtual network simulation devices operated in one or more virtual network simulations and physical devices operated via the bridge device. Through embodiments herein, complex physical devices, for which true virtual node representations may be otherwise limited, can be added into and operated through virtual network simulations via the physical bridge device discussed for embodiments herein in order to facilitate full testing and validation of different network topologies. Thus, embodiments herein may provide for augmenting virtual network topologies through the integration of real physical devices, potentially in combination with virtual network simulation devices, in order to test real-world scenarios on real/physical equipment.

Referring to FIG. 1, FIG. 1 is a block diagram of a system 100 system that may be implemented to facilitate the integration of physical devices within a virtual network simulation, according to an example embodiment.

As shown in FIG. 1, system 100 may include a network simulation system 110 that can interface with one or more external devices, such as external device 192, via one or more external networks 190. As shown in FIG. 1, a user 194 is illustrated, which may operate network simulation system 110 via external device 192 (e.g., a computing device, such as a laptop, desktop computer, or the like).

As illustrated in FIG. 1, network simulation system 110 may include a controller 120 through which one or more virtual network simulations, such as a virtual network simulation 170, may be configured and operated. In some instances, a network simulation as discussed herein can also be referred to as a 'lab'. In at least one embodiment, controller 120 may include simulation logic 122 including bridge management logic 132, user interface (UI) logic 124, a simulation node library 126, network fabric 128, and network input/output (I/O) interfaces, shown in FIG. 1 as network I/O 130. Network I/O 130 is also referred to interchangeably herein as an ethernet hardware interface element.

Network simulation system 110 may further include a bridge device 140 that may be configured to operate as a physical to virtual bridge between one or more physical network elements, such as a physical network element 160(1) and a physical network element 160(2), and one or more virtual network simulations that may be configured/operated via controller 120 for network simulation system 110, such as virtual network simulation 170 shown in FIG. 1. Bridge device 140 may be a physical bridge device/element that may include network I/O 142, control logic 144, a power distribution unit (PDU) 150, ethernet I/O 152, and serial I/O 154 interfaces, shown in FIG. 1 as serial I/O 154, discussed in further detail herein, below. Serial I/O 154 is also referred to interchangeably herein as a serial hardware interface element (e.g., one or more serial hardware interface cards/ports). Network I/O 142 is also referred to interchangeably herein as an ethernet hardware interface element (e.g., one or more ethernet hardware interface cards/ports). Ethernet I/O 152 is also referred to interchangeably herein as an ethernet hardware interface element (e.g., one or more ethernet hardware interface cards/ports). PDU 150 is also referred to interchangeably herein as a power distribution element.

Physical network elements 160(1) and 160(2) can be any physical network elements that may be provided for network simulation system 110 that are intended to be utilized through one or more network simulations configured via controller 120 in accordance with embodiments herein. For example, physical network elements 160(1) and 160(2) can be any combination of physical network elements, including, but not limited to switches, routers, gateways, authentication servers, identity servers, encryption elements/servers, firewalls, etc. as may be desired to be incorporated/operated via one or more network simulations, such as virtual network simulation 170.

Although only two physical network elements are illustrated in FIG. 1, it is to be understood that any number of physical network elements may be configured for network simulation system 110 in accordance with embodiments herein. Further, although only one bridge device is shown in FIG. 1, it is to be understood that any number of bridge devices may be configured for network simulation system 110. Thus, any number/combination of physical network elements and/or bridge devices may be configured for a network simulation system in accordance with embodiments herein.

For network simulation system 110, controller 120, via network I/O 130, can be physically connected to/interfaces with bridge device 140, via network I/O 142, for example, utilizing an ethernet cable connection which can facilitate any combination of network communications (e.g., ethernet communications, serial communications, etc.) in which such connection/interfacing can facilitate in-band management/configuration of the bridge device via controller 120 in accordance with embodiments herein.

Bridge device 140, via PDU 150, can be electrically connected with each of physical network element 160(1) and physical network element 160(2) to facilitate selectively powering on and off the physical network elements based on their inclusion in one or more network simulations configured/operated via controller 120 in accordance with embodiments herein. For example, a first power cable can be connected to a first power port of PDU 150 and to a power port (not shown) of physical network element 160(1) to facilitate selectively providing electrical power to the physical network element 160(1) by bridge device 140. A second power cable can be connected to a second power port of PDU 150 and to a power port (not shown) of physical network element 160(1) to facilitate selectively providing electrical power to the physical network element 160(2) by bridge device 140. Selectively providing electrical power to a given physical network element can include the control logic 144/PDU 150 controlling, via a relay/relays, power ports of the PDU 150 that are connected to power ports or power cables of the physical network devices in order to power on/off the physical network devices.

Bridge device 140, via ethernet I/O 152, can be connected with each of physical network element 160(1) and physical network element 160(2) to facilitate ethernet/network communications between controller 120, bridge device 140, and each physical network element 160(1) and 160(2) in accordance with embodiments herein. For example, one or more first ethernet cables can be connected to one or more first ethernet ports of ethernet I/O 152 and to one or more corresponding ethernet ports (not shown) of physical network element 160(1). Multiple ethernet ports of ethernet I/O 152 and of physical network element 160(1) can be interconnected in some embodiments. Further, one or more second ethernet cables can be connected to one or more second ethernet ports of ethernet I/O 152 and to one or more corresponding ethernet ports (not shown) of physical network element 160(2).

In various embodiments, ethernet I/O 152 can be any number of ethernet/network interface controller (NIC) hardware cards/ports configured for bridge device 140 to facilitate network interconnectivity with any number of physical network elements that may be connected to the bridge device 140. In some embodiments, ethernet I/O 152 may be considered part of and/or configured together in whole or in part with network I/O 142. Thus, network I/O 142 and ethernet I/O 152 can be configured as one or more Ethernet port(s), Fibre Channel ports, any other hardware I/O port(s) now known or hereafter developed and may include and/or interface with one or more network processor units (not shown) in order to provide any suitable interfaces for receiving, transmitting, and/or otherwise communicating data and/or information within system 100 involving bridge device 140.

Bridge device 140, via serial I/O 154, can be connected with each of physical network element 160(1) and physical network element 160(2) to facilitate serial communications between controller 120, bridge device 140 and each physical network element 160(1) and 160(2) in accordance with embodiments herein. For example, a first serial cable can be connected to a first serial port of serial I/O 154 and to a serial port (not shown) of physical network element 160(1) to facilitate serial connectivity between bridge device 140 and physical network element 160(1). A second serial cable can be connected to a second serial port of serial I/O 154 and to a serial port (not shown) of physical network element 160(2) to facilitate serial connectivity between bridge device 140 and physical network element 160(1). In various embodiments, serial I/O 154 can be implemented as any combination of a number of universal serial bus (USB) serial hardware interface ports, a number of Recommended Standard (RS) 232 and/or Video Graphics Array (VGA) serial hardware interface ports, serial hardware cards including any number of serial ports, and/or the like. Thus, bridge device 140 is a physical bridge device/element/node that may include hardware, software, and logic elements in order to facilitate operations as discussed for embodiments herein.

Regarding controller 120, simulation node library 126 may include configuration information that defines each a number of different types of simulation nodes that can be incorporated into a given network simulation in which each of the simulation nodes may be associated with a certain type of network device, such as a switch, a router, a gateway, an optical transmit/receive module, a load balancer, an authentication element, a network interface card, including any variations thereof (e.g., 4-port, 8-port, etc.) and/or any other type of network element that may be utilized within a network simulation. Broadly, a node configuration for a given type of simulation node, as provided for/included within simulation node library 126, can define default parameters and/or operational behavior for the given type of simulation node that can be incorporated into/operated within a given network simulation. When a simulation node of a given type is included in a particular network simulation, additional parameters can be configured for the particular simulation node that is to be used in the network simulation including, but not limited to, an Internet Protocol (IP) address and/or other behavior/parameters of the simulation node.

In at least one embodiment, as shown in FIG. 1, a virtual node type(1) configuration 136(1) can be provided for a first type of simulation node and so on for any 'N' types of virtual simulation nodes (virtual node type (N) configuration 136 (N)) that may be included in any number of network simulations. Also shown in FIG. 1 are a number of physical node configurations that may be representative of physical nodes that may be connected to bridge device 140, such as physical nodes 160(1) and 160(2), including a physical node 160(1) configuration 138(1) and a physical node 160(2) configuration 138(2).

Virtual node type configurations 136(1)-136(N) may define/model the operation/configuration of real-world network elements in which multiple instances of each type of virtual node type configurations 136(1)-136(N) can be included in one or more network simulations. Further, virtual node type configurations 136(1)-136(N) may also include UI display configuration information that can be used by simulation logic 122/UI logic 124 to provide/display a visual UI element, such as a visual/graphical user interface (GUI) icon that represents an instance of each virtual node type, that may be incorporated/included into a virtual network simulation (e.g., dragging and dropping, etc. actions involving a 'nodes' menu, as discussed herein, below) such that a user can incorporate/include the visual UI element corresponding to a given instance of a given node type into a virtual network simulation in order to implement operation of network elements (instances thereof) within virtual network simulations.

In contrast to virtual node type configurations 136(1)-136 (N), physical node configurations configured/provided for simulation node library 126, such as physical node 160(1) configuration 138(1) and physical node 160(2) configuration 138(2) may not define/model the operation of each of physical network elements 160(1) and 160(2), but rather may define the physical connectivity that is provided with each physical network element 160(1) and 160(2) by bridge device 140 in which each of physical node 160(1) configuration 138(1) and physical node 160(2) configuration 138(2) can be configured for simulation node library 126 via bridge management logic 132 and one or more user interface screens provided by controller 120 via UI logic 124 through the in-band management of bridge device 140 in accordance with embodiments herein.

In at least one embodiment, the physical node 160(1) configuration 138(1) can identify a serial port of serial I/O 154 of bridge device 140 that is connected to a serial port (not shown) of physical network element 160(1), can identify one or more ethernet ports of ethernet I/O 152 of bridge device 140 that are connected to one or more ethernet ports (not shown) of physical network element 160(1), and can identify a port of PDU 150 that facilitates providing power to physical network element 160(1) for operation of the physical network element 160(1) within one or more network simulations. In at least one embodiment, the physical node 160(1) configuration 138(1) may also include UI display configuration information that can be used by simulation logic 122/UI logic 124 to provide/display a visual UI element, such as a visual/GUI icon that represents physical network element 160(1), such that a user can incorporate/include the visual UI element corresponding to the physical network element 160(1) into a virtual network simulation (e.g., dragging and dropping, etc. actions, as discussed herein, below) in order to implement operation of physical network element 160(1) within the virtual network simulation.

In at least one embodiment, the physical node 160(2) configuration 138(2) can identify a serial port of serial I/O 154 of bridge device 140 that is connected to a serial port (not shown) of physical network element 160(2), can identify one or more ethernet ports of ethernet I/O 152 of bridge device 140 that are connected to one or more ethernet ports (not shown) of physical network element 160(2), and can identify a port of PDU 150 that facilitates providing power to physical network element 160(2) for operation of the physical network element 160(2) within one or more network simulations. In at least one embodiment, the physical node 160(2) configuration 138(2) may also include UI display configuration information that can be used by simulation logic 122/UI logic 124 to provide/display a visual UI element, such as a visual/GUI icon that represents physical network element 160(2), such that a user can incorporate the visual UI element corresponding to the physical network element 160(2) into a virtual network simulation in order to implement operation of the physical network element 160(2) within the virtual network simulation In-band configuration operations of bridge device 140 and physical node configurations of different physical devices that may be connected thereto within the operation of network simulation system 110 are discussed in further detail herein, below, for example, with reference to user interface screens illustrated for FIGS. 2A and 2B.

In various embodiments, network I/O 130 provided for controller 120 can be configured as one or more Ethernet port(s), Fibre Channel ports, any other network hardware I/O port(s) now known or hereafter developed and may include and/or interface with one or more network processor units as may be provided via network fabric 128 provided for controller 120 in order to provide any suitable interfaces for receiving, transmitting, and/or otherwise communicating data and/or information within system 100.

Network fabric 128 in combination with network I/O 130 may be configured/operate as a common fabric provided via network simulation system 110 that facilitates connecting nodes and providing interfaces that facilitate connections to external endpoints and bridge device 140, as well as any physical devices connected thereto (e.g., physical network element 160(1) and physical network element 160(2)) that can be plumbed or connected back to the controller 120 in order to facilitate the management, configuration, and operation of simulation nodes and network simulations provided for network simulation system 110.

Network fabric 128, via network I/O 130, may allow or facilitate serial access to physical network elements that may be connected to bridge device 140 in which the control/management/configuration of such elements can be facilitated via virtual machine (VM) consoles, virtual network computing (VNC) screens, and/or the like (sometimes referred to as 'teletypewriter' (TTY) screens/interfaces) that may be accessed/provided by physical network elements 160(1) and 160(2). In some instances, different virtual simulation node instance(s) provided for network simulation(s) may also facilitate serial access capabilities in order to control/manage/configure operations(s) of simulation node instance(s). Access to console and VNC devices on different physical network elements can utilize techniques as described herein by leveraging device multiplexing within network simulation system 110 (where all consoles/VNC devices are accessible via a central dispatcher running on the controller 120 provided via network fabric 128/network I/O 130).

In at least one embodiment, network fabric 128 can include/interface with one or more network processor units and one or more firewalls that may inspect/monitor traffic communication between network simulation system 110 (e.g., controller 120, one or more network simulations, simulation nodes, etc.) and one or more external networks/devices in order to protect network simulation system 110 from attacks, exploits, worms, and/or any other security threats.

Controller 120, via UI logic 124, may facilitate one or more user interface or display screens, such as GUIs, through which bridge device 140, one or more node configurations of simulation node library 126, one or more network simulations, and/or any combination thereof may be configured, managed, and/or otherwise natively operated in-band within network simulation system 110.

Broadly during operation of system 100, each of the simulation logic 122 including bridge management logic 132, UI logic 124, simulation node library 126, network fabric 128, and network I/O 130 may interface and operate together in combination with bridge device 140 and one or more physical devices connected thereto (e.g., physical network element 160(1) and physical network element 160(2)) in any appropriate manner in order to facilitate configuring and operating one or more virtual network simulations, such as virtual network simulation 170, by one or more users, such as user 194 via external device 192, in accordance with embodiments herein.

Configuration of a virtual network simulation, such as virtual network simulation 170, is discussed in further detail with reference to FIG. 3, discussed below, and may include user 194 interacting with one or more UI screens (e.g., providing user inputs) to drag and drop instances of different types of simulations nodes (as defined via configurations 136(1)-136(N)) into a given virtual network simulation and connecting the instances together for performing the virtual network simulation operations.

For physical network elements whose operation is desired to be utilized in a given network simulation, a visual/GUI icon of a given physical network element, as defined via configuration 138(1) or 138(2) and displayed in a 'nodes' menu within a workspace UI (sometimes referred to as a 'canvas'), for example, can be dragged and dropped into a network simulation and connected with other nodes (virtual or physical) in a similar manner as instances of virtual node types. However, a given physical network element may only be used in one network simulation at a time. Thus, in accordance with embodiments herein, physical network elements, when configured for use with a bridge device, such as bridge device 140 can be added to simulation node library 126 and configured as part of a globally accessible pool of physical nodes that can be accessible for use in a network simulation until they are actually assigned to a given network simulation/lab. Once a physical network element (e.g., the visual icon representing the physical network element) is added to a network simulation/lab, it is removed from the global pool until the physical network element (the visual icon representing the physical network element) is removed from the network simulation/lab. Once removed from a network simulation/lab, the physical network element can be reassigned to the global pool. In some embodiments, an optional cleanup routine can be executed that can include a set of commands sent to the serial port of a given physical network element in which the commands can be used to return the physical network element to factory settings and power down the physical network element.

Referring back to FIG. 1, consider in one example, that virtual network simulation 170 can be configured to include an instance of virtual node type (1) (as configured via configuration 136(1)), shown as simulation node instance(1) 172(1) in virtual network simulation 170 that may correspond to a visual/GUI icon configured to represent virtual node type (1). Further, consider that virtual network simulation 170 can be configured to include a simulation node 174 that may correspond to a visual/GUI icon configured to represent physical network element 160(1) as may be defined in physical node 160(1) configuration 138(1), which can be provided for the global pool of available physical network devices that can be stored in simulation node library 126 once the physical network element 160(1) is configured for and connected to bridge device 140 and thereafter removed from/added back to the pool as the physical network device 160(1) is included within or removed from a given network simulation, such as virtual network simulation 170.

Referring back to FIG. 1 regarding in-band operation of bridge device 140 in accordance with embodiments herein, control logic 144 may facilitate operation of bridge device 140 and may facilitate interconnectivity/interfacing between network I/O 142, PDU 150, ethernet I/O 152, and serial I/O 154.

In at least one embodiment, control logic 144 may operate provide an Application Programming Interface (API) through which a remote procedure call (RPC) framework, such as gRPC or the like, can be used by controller 120 to start/stop node actions (e.g., start=power on, stop=power off) for powering on/off one or more of physical network element 160(1) and/or physical network element 160(2) upon inclusion of one or both of the physical network elements in a given network simulation or removal from a given network simulation. The control logic 144 can translate one or more start/stop node actions communicated from controller 120 to bridge device in order to control the PDU 150 (e.g., via a low level driver) in order to power on/off a corresponding power port connected to a given physical network element.

In at least one embodiment, control logic 144 may be configured to logically facilitate network fabric for bridge device 140 for network I/O 142 and ethernet I/O 152 connectivity involving ethernet-based communications for physical devices connected to bridge device 140, such as physical network element 160(1) and physical network element 160(2), including any appropriate network communication protocols, such as User Datagram Protocol (UDP) communications, Transmission Control Protocol (TCP) communications, and/or the like. During operation of bridge device 140, control logic 144 may operate to map physical ethernet ports of ethernet I/O 152 to Unix domain logical sockets that can be interconnected across UDP connections between bridge device 140/network I/O 142 and controller 120/network I/O 130/network fabric 128.

In at least one embodiment, control logic 144 may be configured to facilitate multiplexing (MUX) communications to facilitate network I/O 142 and serial I/O 154 connectivity involving serial-based communications for physical devices connected to bridge device 140, such as physical network element 160(1) and physical network element 160(2), including any appropriate serial communication protocols, such as WebSocket (ws) communications or TCP communications. During operation of bridge device 140, control logic 144 may operate to map physical serial ports of serial I/O 154 to Unix domain sockets that can be mapped to a WebSocket provided via network I/O 142 back to the network I/O 130, which provides serial access to the bridge device 140 by controller 120.

Broadly in accordance with embodiments herein, bridge device 140 may be representative of a physical server that runs/executes an OS, such as Linux, that can be used natively/in-band within network simulation system 110 as a physical to virtual bridge between one or more physical network elements, such as a physical network element 160(1) and a physical network element 160(2), and one or more network simulations that may be configured/operated via controller 120 for network simulation system 110, such as virtual network simulation 170 shown in FIG. 1. Along with network I/O 142 to facilitate connection/control of the bridge device 140 by controller 120, the bridge device 140 can be equipped with ethernet I/O 152 and serial I/O 154 that can be attached (cabled) to corresponding ports of physical network elements (e.g., 160(1) and 160(2)) that can be used inside one or more network simulations. In at least one embodiment, a tunneling mechanism could be facilitated via ethernet connectivity provided by bridge device 140 that may allow for termination of an Institute of Electrical and Electronics Engineers (IEEE) 802.1Q virtual local area network (VLAN) tunnel (sometime referred to as a 'Q-in-Q' tunnel), a Virtual extensible Local Area Network (VxLAN) connection, and/or the like into network fabric 128. For powering the physical network elements, PDU 150 can be controlled by the bridge device 140 based on commands received from controller 120.

During operation of network simulation system 110, bridge device 140, upon powering on and connection with controller 120, will automatically register to the controller 120 and, once registered to the controller 120, an administrator, such as user 194, can configure, via bridge management logic 132 and one or more user interface screens provided via UI logic 124, the physical network elements 160(1) and 160(2) and the corresponding serial, ethernet and PDU ports to which each is connected to bridge device 140. A registration process can be performed between the bridge device 140 and the controller 120 in order to add/associate the bridge device 140 to the controller 120 such that the controller 120, via bridge management logic 132, can facilitate management/control of the bridge device 140. In some embodiments, the registration process can involve providing a password, certificate, and/or any other credentials by the bridge device 140 to the controller 120, which can trigger the controller 120 to add the bridge device 140 into the management/control ecosystem of the network simulation system 110 provided via controller 120. Thus, native/in-band management of bridge device 140 can be facilitated in accordance with embodiments herein.

In some embodiments, a user/administrator can set permissions for one or more of the physical network elements that can restrict the assignment/use of one or more corresponding physical network elements within one or more particular network simulations. For example, such restrictions can be set based on a network simulation 'name' or other label uniquely identifying a given network simulation/lab. In some embodiments, a user/administrator can specify resources to be utilized by a given physical network element (e.g., memory consumption, central processing unit (CPU) consumption, etc.) as the resources may relate to resource pooling for a given network simulation.

Figure 2A:
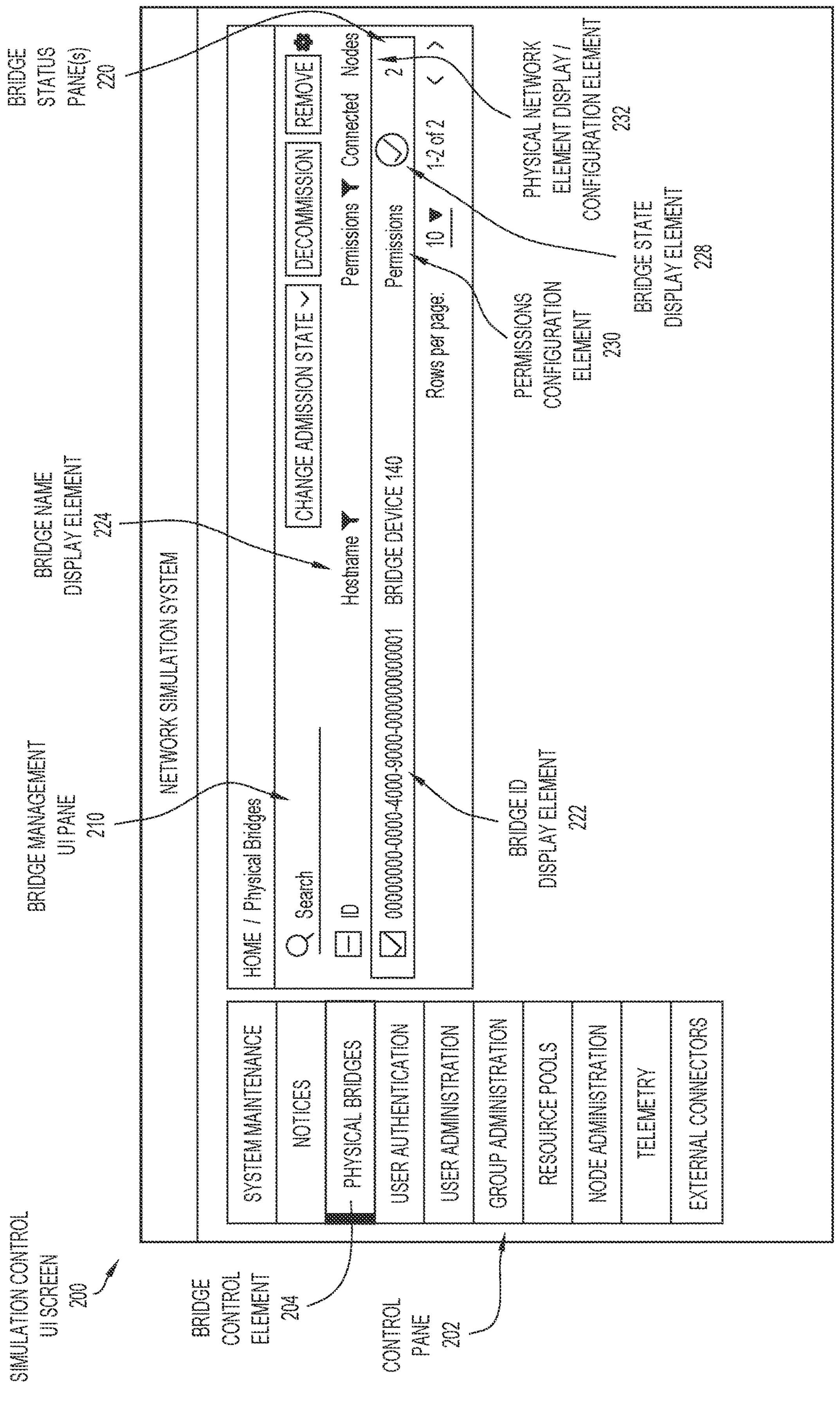
FIG. 2A is a diagram illustrating example details for an example simulation control user interface (UI) screen including a bridge management UI pane that may be utilized to facilitate in-band configuration of the bridge device of FIG. 1, according to an example embodiment.
Figure 2B:
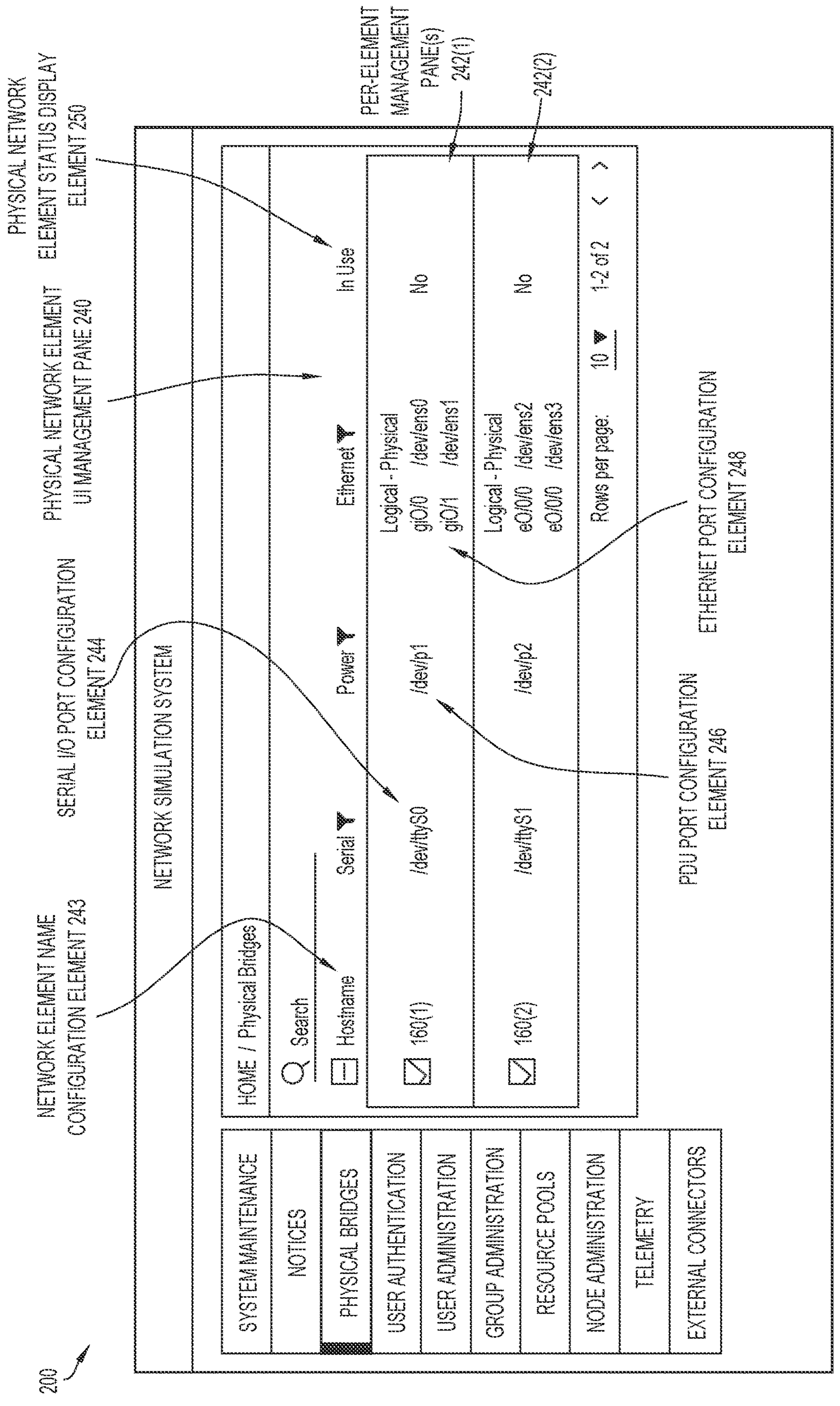
FIG. 2B is a diagram illustrating example details for an example physical network element user interface (UI) management pane that may be utilized to facilitate in-band configuration of bridge device of FIG. 1 for connections with physical network elements connected to the bridge device, according to an example embodiment.

Consider various UI operations that can be utilized by a user, such as user 194, to configure bridge device 140 for connections with physical network elements 160(1) and 160(2) within network simulation system 110 for operation the physical network elements 160(1) and/or 160(2) within a virtual network simulation as discussed with reference to FIGS. 2A and 2B, discussed below. For example, FIG. 2A is a diagram illustrating example details for an example simulation control user interface (UI) 200 screen including a bridge management UI pane 210 that may be utilized to facilitate native/in-band configuration of bridge device 140 via controller 120 by a user, such as user 194, operating controller 120 via external device 192, according to an example embodiment. FIG. 2B is a diagram illustrating example details for an example physical network element UI management pane 240 that may be utilized to facilitate native/in-band configuration of bridge device 140 for connections with physical network elements 160(1) and 160(2) that are connected to the bridge device 140, according to an example embodiment.

As illustrated in FIG. 2A, simulation control UI screen 200 can include a number of display and/or configuration elements that can be interacted with by user 194 (e.g., user inputs provided by the user 194) via any combination of mouse selections (e.g., left/right button mouse 'clicks') and/or keyboard entries provided by the user 194 via external device 192 that are obtained by controller 120 to facilitate in-band bridge management operations in accordance with embodiments herein. For example, simulation control UI screen 200 can include a control pane 202 that includes a number of UI elements, such as a bridge control element 204 that the user can select to view and/or manage bridge device 140 that is connected to and, for the purposes of FIGS. 2A and 2B, is considered to be successfully registered to controller 120.

Further for the example of FIGS. 2A and 2B, it is assumed that each physical network element 160(1) and 160(2) is connected to corresponding serial, ethernet, and PDU ports of bridge device 140. Each physical network element 160(1) and 160(2) need not be powered-on to facilitate configuration of bridge device 140 by user 194 in accordance with embodiments herein. Further, physical connections of each physical network element 160(1) and 160(2) and bridge device 140 need not be completed prior to configuring bridge device 140; rather, physical connections between each physical network element 160(1) and 160(2) need only be completed (and correctly align with the configuration as provided for the bridge device 140) in order to successfully utilize each physical network element within a corresponding network simulation.

As shown in FIG. 2A, a number of bridge status pane(s) 220 can be displayed via the bridge management UI pane 210 for each of a number of bridge devices that can be connected to controller 120. As a single bridge device 140 is discussed for the present example, only one bridge status pane is shown. Various bridge information can be illustrated and/or configured via the bridge management UI pane 210. For example, a bridge identity (ID) display element 222 displays an ID of the bridge device 140 and a bridge name display element 224 displays a name (or hostname) of the bridge device 140. A bridge ID can be useful for instances in which multiple bridges may be connected to controller such that different configuration settings for different bridges can be identified for sending commands to the correct corresponding bridges, based on the ID of each bridge. A bridge state display element 228 can be provided to display whether bridge device 140 on/actively connected to controller 120 (e.g., a green 'check' mark indicating that the bridge device 140 is on/connected to the controller or a red 'x' mark indicating that the bridge device 140 is off/not actively connected to the controller 120).

A permissions configuration element 230 can be selected in order to configure/identify any network simulation/lab restrictions to which any physical network elements connected to bridge device 140 cannot be assigned.

A physical network element display/configuration element 232 can be utilized to both display the number of physical network elements configured for connection with the bridge device (e.g., 2 in this example) and also can be selected by the user 194 in order to toggle/control the simulation control UI screen 200 to display a physical network element UI management pane 240, as shown in FIG. 2B, discussed below. In various embodiments, the user 194 can perform a mouse click on the "Nodes" or the number element of the physical network element display/configuration element 232 in order to toggle/control the simulation control UI screen 200 to display the physical network element UI management pane 240.

Moving to FIG. 2B illustrating the physical network element UI management pane 240, a number of per-element management panes can be displayed via the simulation controller UI screen 200 for each of multiple physical network element connections that can be configured for bridge device 140 via user inputs obtained by the controller 120 via various elements provided for the physical network element UI management pane 240. For example, per-element management pane 242(1) can be used to display and configure PDU, ethernet, and serial connectivity for connection of physical network element 160(1) with bridge device 140 and per-element management pane 242(2) can be used to display and configure PDU, ethernet, and serial connectivity for connection of physical network element 160(2) with bridge device 140.

For example, a network element name configuration element 243 can be interacted with by the user 194 to view/edit/assign the name of physical network elements (e.g., 160(1) and 160(2)) connected to the bridge device 140. A serial I/O port configuration element 244 can be interacted with by the user 194 (e.g., a mouse-click to select and keyboard entries to edit) to view/edit/assign each serial port of serial I/O 154 of bridge device 140 that is connected to the serial port of each corresponding physical network element 160(1) and 160(2). A PDU port configuration element 246 can interacted with by the user 194 to view/edit/assign each PDU port of PDU 150 of bridge device 140 that is connected to the power port/connection of each corresponding physical network element 160(1) and 160(2).

An ethernet port configuration element 248 can be interacted with by the user 194 to view/edit/assign each ethernet port of ethernet I/O 152 that is connected to each ethernet port of each corresponding physical network element 160(1) and 160(2). As shown in FIG. 2B, each physical network element 160(1) and 160(2) can each include two ethernet connections with the bridge device. The ethernet port configuration element 248 can be interacted with by the user 194 to view/edit/assign both physical port information and logical port information for each ethernet port of ethernet I/O 152 in which the logical port information can be used to facilitate socket/mapping operations for plumbing/connecting each physical network element 160(1) and 160(2) into network fabric 128 for connections within one or more network simulations in which one or both of physical network elements 160(1) and 160(2) may be incorporated/implemented.

A physical network element status display element 250 can be used to indicate whether a given physical network element is currently in use or, stated differently, is currently being used/operated within a given virtual network simulation.

Upon configuring connections of physical network elements 160(1) and 160(2) for bridge device 140, a physical node configuration for each physical network element 160 (1) and 160(2), such as physical node 160(1) configuration 138(1) and physical node 160(2) configuration 138(2) as shown in FIG. 1, can be populated/stored within a pool of physical network elements via simulation node library 126 in which each corresponding configuration identifies the PDU, serial, and ethernet connections (along with visual/GUI icon information) for each physical network element 160(1) and 160(2) such that either/both of the physical network elements 160(1) and/or 160(2) can be incorporated/used/implemented for operation within a virtual network simulation.

Figure 3:
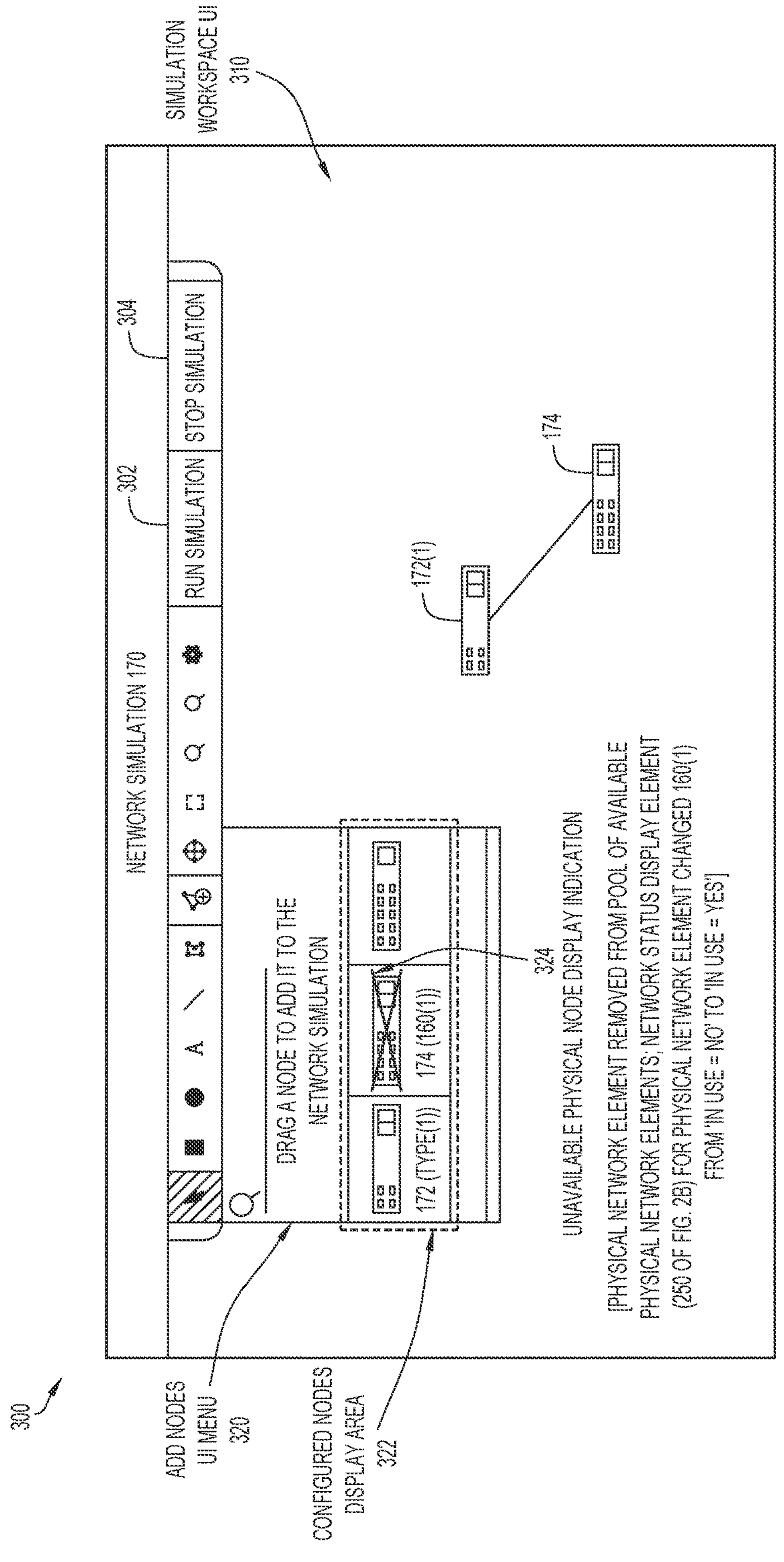
FIG. 3 is a diagram illustrating example details for an example user interface screen that may be utilized for configuring and operating a virtual network simulation utilizing the system of FIG. 1, according to an example embodiment.

Turning to FIG. 3, FIG. 3 is a diagram illustrating example details for an example user interface screen 300 that may be utilized for configuring and operating virtual network simulation 170 utilizing the system of FIG. 1. In particular, FIG. 3 illustrates a simulation workspace UI 310 of the user interface screen 300 in which user 194 can interact in order to configure the virtual network simulation 170 for operation within the network simulation system 110.

As generally illustrated via FIG. 3, configuration and operation of a given virtual network simulation, such as virtual network simulation 170 can involve a user, such as user 194, via any combination of mouse selections and/or keyboard entries provided by the user 194 via external device 192 that is in communication with controller 120 configuring the virtual network simulation 170, for example, by dragging and dropping an instance of a given simulation node type or a physical node representation into the simulation workspace UI 310 of the user interface screen 300, as shown in FIG. 3, which can be facilitated via UI logic 124 of controller 120.

Consider an illustrative example of configuring and operating a network simulation, such as for configuring and operating virtual network simulation 170. The example regarding virtual network simulation 170 is provided for illustrative purposes only and is not meant to limit the broad scope of embodiments herein. For example, as illustrated in FIG. 3, the user 194 click on the visual/GUI icon labeled 172 in FIG. 3 that corresponds to the node type(1) configuration 136(1) as defined in simulation node library 126, which can be displayed within a configured nodes display area 322 of an 'add nodes' UI menu 320 that can be provided within/for the simulation workspace UI 310, and the user 194 can drag/drop an instance of node type(1) into the virtual network simulation 170, shown as simulation node instance(1) 172(1) in order to implement operation of the virtual node type(1) within the virtual network simulation 170.

A similar action can be performed to effectively incorporate/implement use/operation of the physical network element 160(1) within the virtual network simulation 170 such that the user 194 can click on the visual/GUI icon labeled 174 within the configured nodes display area 322 and the user 194 can drag/drop the visual/GUI icon into the virtual network simulation 170. As discussed above, unlike virtual nodes for which multiple instances of a given type of virtual node can be incorporated into multiple virtual network simulations, physical network elements can be limited to use within only one virtual network simulation at time. Thus, by incorporating the physical network element 160(1) into virtual network simulation 170, the controller 120, via simulation logic 122, is caused to remove the physical network element 160(1) from the available pool of physical network elements connected to bridge device 140 that can be used in another virtual network simulation. The controller 120, via simulation logic 122/UI logic 124, can trigger an unavailable physical node display indication 324 to be displayed for the visual/GUI icon labeled 174 in the configured nodes display area 322 to indicate that the physical network element 160(1) is effectively removed from the pool of available physical network elements and cannot be used again for another network simulation until it is removed from virtual network simulation 170.

Further, although not shown in FIG. 3, the physical network element status display element 250 of FIG. 2A for the per-element management pane 242(1) for physical network element 160(1) can be changed from 'In Use=No' to 'In Use=Yes') upon incorporation of the physical network element 160(1) into virtual network simulation 170 by the user 194. Additionally, the controller 120, via simulation logic 122, can send a trigger to the bridge device 140 (e.g., via a 'Start' API call) to trigger the bridge device to power-on/power-off (start/stop) the physical network element 160(1) via the corresponding PDU 150 port that has been configured for the corresponding physical network element 160(1) (e.g., via the physical network element UI management pane 240 of FIG. 2B) once the physical network element 160(1) or, more specifically, the visual/GUI icon labeled 174 has been added into virtual network simulation 170. Start/stop control for the physical network element 160(1) can be managed using any appropriate techniques, such as a right-click on the icon labeled 174 and selecting a 'Start' or 'Stop' menu item from a pop-up menu/control pane, through one or more key strokes, through one or more UI elements that may be provided for the simulation workspace UI 310, and/or the like.

FIG. 3 illustrates an 'X' placed over the visual/GUI icon labeled 174 as the unavailable physical node display indication 324 to indicate that physical network element 160(1) is unavailable for inclusion in another virtual network simulation, however, it is to be understood that any visual display indication can be utilized to illustrate that a given physical network element is unavailable for use (e.g., changing the icon to be a ghost image, hashing the icon, etc.) within the configured nodes display area 322.

Within the simulation workspace UI 310, the user 194 can connect the two simulation nodes together (e.g., generally illustrated via the line interconnecting the simulation nodes 172(1) and 174) and/or otherwise interact with the simulation nodes (e.g., configuring IP addresses, settings, opening VM/VNC terminals, etc.). The controller 120, via simulation logic 122 and network fabric 128, can facilitate interconnection between each of the simulation nodes and network fabric 128/network I/O 130 for operation (e.g., at runtime) of the virtual network simulation 170.

In one example, the user 194 can start the virtual network simulation 170 via selection of a UI element 302 (e.g., a button, etc. labeled 'Start Simulation') and can stop the virtual network simulation 170 via selection of a UI element 304 (e.g., a button, etc. labeled 'Stop Simulation'), each of which can be provided via user interface screen 300 as shown in FIG. 3.

When the virtual network simulation 170 is closed/removed and/or physical network element 160(1) is no longer included in the virtual network simulation, the controller 120 can remove the unavailable physical node display indication from the visual/GUI icon labeled 174 in the configured nodes display area 322 and the physical network element 160(1) can be returned to the pool of available physical network elements managed via the simulation node library 126. Additionally, the controller 120, via simulation logic 122, can send a trigger to the bridge device 140 (e.g., via a 'Stop' API call) to trigger the bridge device to power-off the physical network element 160(1) via the corresponding PDU 150 port that has been configured for the corresponding physical network element 160(1) (e.g., via the physical network element UI management pane 240 of FIG. 2B) when the physical network element 160(1) is no longer included in the virtual network simulation 170 and/or the simulation itself is deleted/closed.

Figure 4:
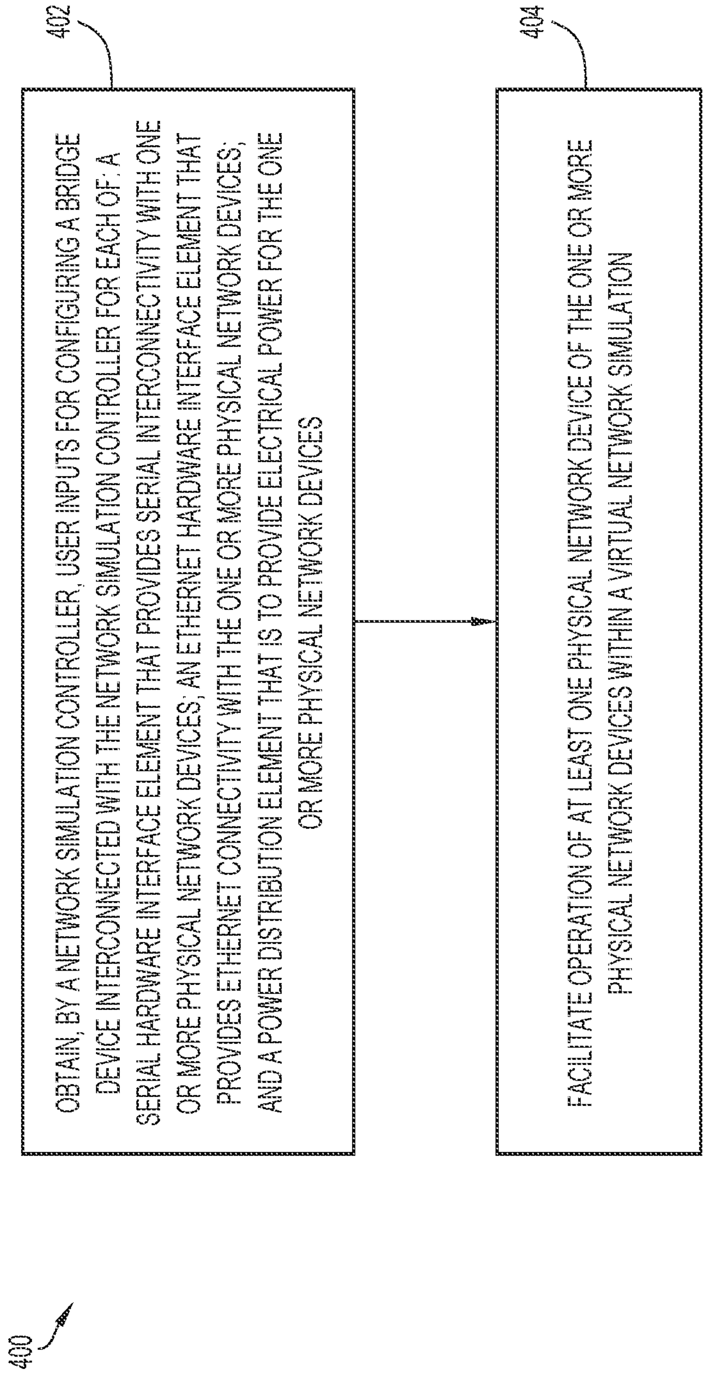
FIG. 4 is a flow diagram depicting a method, according to an example embodiment.

Referring to FIG. 4, FIG. 4 is a flow chart depicting a method 400 associated with operations that may be performed to facilitate the integration of physical network elements within a virtual network simulation using a bridge device, according to an example, embodiment. In at least one embodiment, method 400 may be performed via a simulation controller, such as controller 120 of network simulation system 110 that is connected to a bridge device, such as bridge device 140, that is further connected to one or more physical network elements, such as physical network elements 160(1) and 160(2), as shown in FIG. 1.

As shown at 402, the method may include obtaining, by a network simulation controller (e.g., controller 120), user inputs (e.g., via various user interface screens as shown in FIGS. 2A and 2B) for configuring a bridge device interconnected with the network simulation controller for each of: a serial hardware interface element that provides serial interconnectivity with one or more physical network devices; an ethernet hardware interface element that provides ethernet connectivity with the one or more physical network devices; and a power distribution element that is to provide electrical power for the one or more physical network devices.

As shown at 404, the method may further include facilitating operation of at least one physical network device of the one or more physical network devices within a virtual network simulation. In at least one embodiment, facilitating the operation of the at least one physical network device may include the network simulation controller sending a trigger to the bridge device to power on the at least one physical network element via the power distribution element upon the at least one physical network device being included in the virtual network simulation.

In at least one embodiment, facilitating the operation of the at least one physical network device of the one or more physical network devices further comprises: removing the at least one physical network device of the one or more physical network devices from a pool of available physical network devices when the at least one physical network device is included in the virtual network simulation; and returning the at least one physical network device of the one or more physical network devices to the pool of available physical network devices when the at least one physical network device is removed from the virtual network simulation Accordingly, embodiments herein may provide for the ability to augment virtual network topologies with the incorporation of real physical devices/network elements within the operation of virtual network simulations in order to facilitate testing of real-world scenarios on real, physical network equipment. Such embodiments may allow for testing complex devices without the need for a true virtual node representation/model to be defined in a virtual network simulation system/environment to enable true testing and validation of different network topologies and/or devices.

Figure 5:
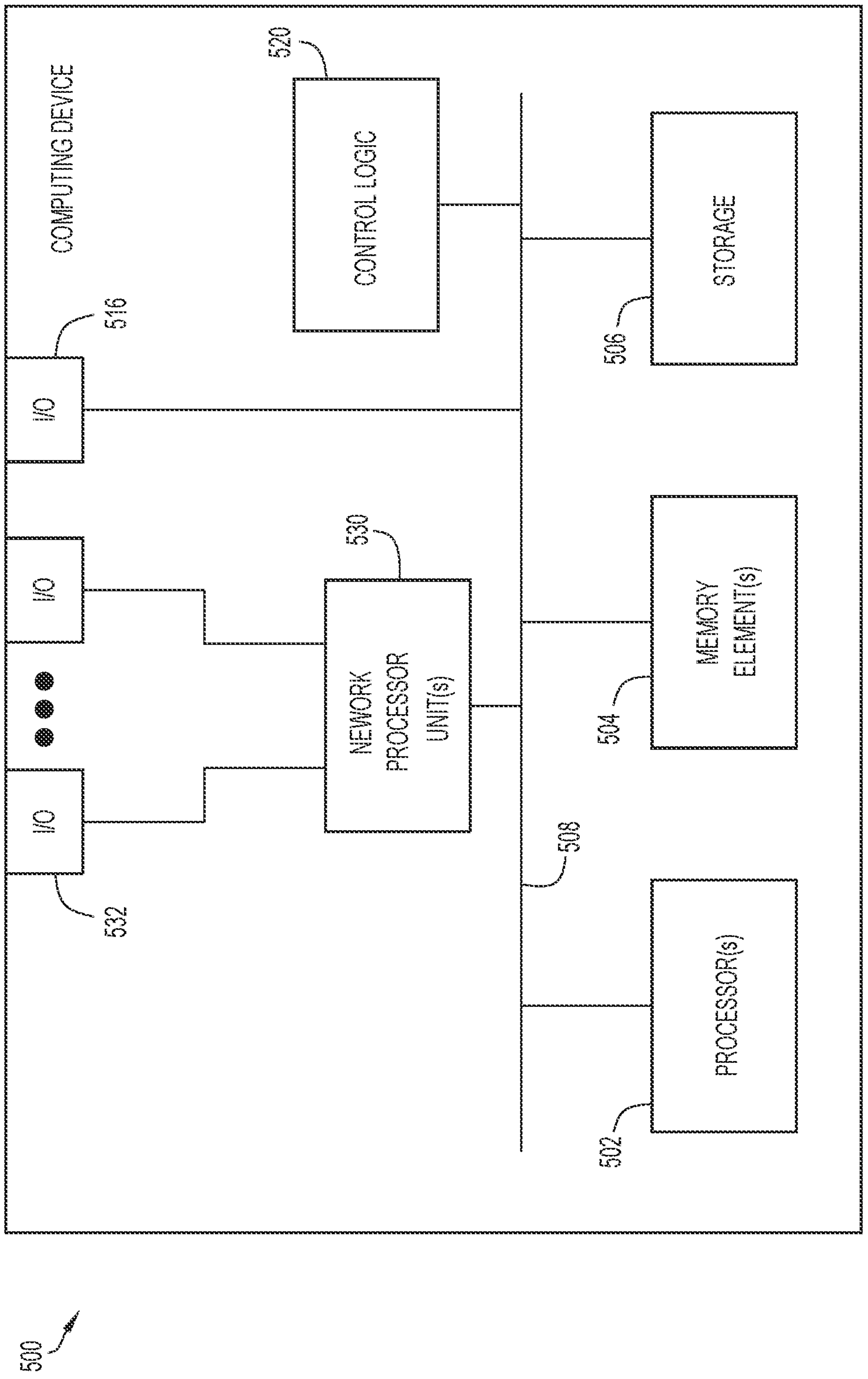
FIG. 5 illustrates a hardware block diagram of a computing device configured to perform functions associated with operations discussed in connection with embodiments herein.

Referring to FIG. 5, FIG. 5 illustrates a hardware block diagram of a computing device 500 that may perform functions associated with operations discussed herein in connection with the techniques described for embodiments herein. In various embodiments, a computing device or apparatus, such as computing device 500 or any combination of computing devices 500, may be configured as any entity/entities in order to perform operations of the various techniques discussed for embodiments herein, such as any elements, functions, etc. discussed for embodiments herein (e.g., controller 120, external device 192, bridge device 140, etc.).

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein. In least one embodiment, control logic 520 can be configured to include UI logic 124, simulation logic 122, and bridge management logic 132 of controller 120.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a network simulation controller, user inputs for configuring a bridge device interconnected with the network simulation controller for each of: a serial hardware interface element that provides serial interconnectivity with one or more physical network devices; an ethernet hardware interface element that provides ethernet connectivity with the one or more physical network devices; and a power distribution element that is to provide electrical power for the one or more physical network devices; and facilitating operation of at least one physical network device of the one or more physical network devices within a virtual network simulation.

In at least one instance, facilitating the operation of the at least one physical network device may include the network simulation controller sending a trigger to the bridge device to power on the at least one physical network element via the power distribution element upon the at least one physical network device being included in the virtual network simulation.

In at least one instance, facilitating the operation of the at least one physical network device of the one or more physical network devices further comprises: removing the at least one physical network device of the one or more physical network devices from a pool of available physical network devices when the at least one physical network device is included in the virtual network simulation; and returning the at least one physical network device of the one or more physical network devices to the pool of available physical network devices when the at least one physical network device is removed from the virtual network simulation.

In one form, a network simulation system is provided that may include a network simulation controller and a bridge device comprising: a serial hardware interface element that provides serial interconnectivity with one or more physical network devices; a first ethernet hardware interface element that provides ethernet connectivity with the one or more physical network devices; a second ethernet hardware interface element that provides ethernet connectivity with the network simulation controller; and a power distribution element that provides electrical power that is to provide electrical power to the one or more physical network devices, wherein the network simulation controller operates to facilitate configuration of the bridge device for operation of the one or more physical network devices within at least one network simulation.

In one instance, the network simulation system of claim 1 further comprises a user interface provided by the network simulation controller to facilitate configuration of ethernet connectivity and serial connectivity of the bridge device with at least one physical network device of the one or more physical network devices. In one instance, the user interface comprises a first user interface element to facilitate configuration of one or more ethernet ports of the first ethernet hardware interface element of the bridge device that interfaces with one or more ethernet ports of the at least one physical network device. In one instance, the user interface comprises a second user interface element to facilitate configuration of a serial port of the serial hardware interface element of the bridge device that interfaces with a serial port of the at least one physical network device. In one instance, the user interface comprises a third user interface element that indicates whether the at least one physical network device is in use in a virtual network simulation.

In one instance, the network simulation system further comprises a user interface provided by the network simulation controller to facilitate including at least one physical network device of the one or more physical network devices in a virtual network simulation. In one instance, the network simulation controller, via the power distribution element of the bridge device, triggers the at least one physical network device to power-on for operation in the virtual network simulation. In one instance, the network simulation controller removes the at least one physical network device of the one or more physical network devices from a pool of available physical network devices when the at least one physical network device is included in the virtual network simulation.

In one instance, the network simulation system further includes a user interface display indication provided by the network simulation controller indicating that the at least one physical network device of the one or more physical network devices is unavailable for inclusion in another virtual network simulation. In one instance, the network simulation controller returns the at least one physical network device of the one or more physical network devices to the pool of available physical network devices when the at least one physical network device is removed from the virtual network simulation. In one instance, the network simulation controller removes the user interface display indication indicating that the at least one physical network device of the one or more physical network devices is unavailable for inclusion in another network simulation.

In one form, a bridge device of a network simulation system is provided, the bridge device comprising: a serial hardware interface element that provides serial interconnectivity with one or more physical network devices; a first ethernet hardware interface element that provides ethernet connectivity with the one or more physical network devices; a second ethernet hardware interface element that provides ethernet connectivity with a network simulation controller; and a power distribution element that is to provide electrical power for the one or more physical network devices.

In one instance, the bridge device further comprises at least one memory element for storing data; and at least one processor for executing instructions associated with the data, wherein executing the instructions causes the bridge device to perform operations, comprising: registering with the network simulation controller via the second ethernet hardware interface, wherein the network simulation controller facilitates configuration of interconnectivity of the bridge device with the one or more physical network elements via one or more user interface screens.

In one instance, executing the instructions causes the bridge device to perform further operations, comprising: receiving a trigger from the network simulation controller to power on at least one physical network device of the one or more physical network devices; and based on the trigger, providing electrical power to the at least one physical network device of the one or more physical network devices for operation of the at least one physical network device within a virtual network simulation. In one instance, the trigger is received via an Application Programming Interface (API) call received from the network simulation controller.

In one instance, executing the instructions causes the bridge device to perform further operations, comprising: receiving a trigger from the network simulation controller to power off at least one physical network device of the one or more physical network devices; and based on the trigger, removing the electrical power from the at least one physical network device of the one or more physical network devices.

In one instance, executing the instructions causes the bridge device to perform further operations, comprising: mapping one or more ethernet ports of first ethernet hardware interface element that is interconnected one or more corresponding ethernet ports of the at least one physical network device to one or more corresponding sockets that facilitate User Datagram Protocol (UDP) communications between the at least one physical network device and the network simulation controller.

In one instance, executing the instructions causes the bridge device to perform further operations, comprising: mapping a serial port of the serial hardware interface element that is interconnected with a serial port of the at least one physical network device to a WebSocket that facilitates serial communications between the at least one physical network device and the network simulation controller.

Variations and Implementations

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A network simulation system, comprising:

a network simulation controller;

a user interface provided by the network simulation controller; and a bridge device comprising:

a serial hardware interface element that provides serial interconnectivity with one or more physical network devices;

a first ethernet hardware interface element that provides ethernet connectivity with the one or more physical network devices; a second ethernet hardware interface element that provides ethernet connectivity with the network simulation controller; and a power distribution element that is to provide electrical power to the one or more physical network devices, wherein the network simulation controller operates to facilitate configuration of configure the bridge device for operation of the one or more physical network devices within at least one network simulation; and upon obtaining one or more user inputs via the user interface for including at least one physical network device of the one or more physical network devices in a virtual network simulation, triggering, by the network simulation controller, via the power distribution element of the bridge device, the at least one physical network device to power on for operation in the virtual network simulation.

2. The network simulation system of claim 1, further comprising: upon obtaining one or more user inputs via the user interface, configuring ethernet connectivity and serial connectivity of the bridge device with at least one physical network device of the one or more physical network devices.

3. The network simulation system of claim 2, wherein the user interface comprises a first user interface element for configuring one or more ethernet ports of the first ethernet hardware interface element of the bridge device that interfaces with one or more ethernet ports of the at least one physical network device.

4. The network simulation system of claim 3, wherein the user interface comprises a second user interface element for configuring a serial port of the serial hardware interface element of the bridge device that interfaces with a serial port of the at least one physical network device.

5. The network simulation system of claim 4, wherein the user interface comprises a third user interface element that indicates whether the at least one physical network device is in use in a virtual network simulation.

6. The network simulation system of claim 1, further comprising:

upon obtaining one or more user inputs via the user interface, including at least one physical network device of the one or more physical network devices in a virtual network simulation.

7. The network simulation system of claim 6, wherein the network simulation controller removes the at least one physical network device of the one or more physical network devices from a pool of available physical network devices when the at least one physical network device is included in the virtual network simulation.

8. The network simulation system of claim 7, further comprising: a user interface display indication provided by the network simulation controller indicating that the at least one physical network device of the one or more physical network devices is unavailable for inclusion in another virtual network simulation.

9. The network simulation system of claim 8, wherein the network simulation controller returns the at least one physical network device of the one or more physical network devices to the pool of available physical network devices when the at least one physical network device is removed from the virtual network simulation.

10. The network simulation system of claim 9, wherein the network simulation controller removes the user interface display indication indicating that the at least one physical network device of the one or more physical network devices is unavailable for inclusion in another network simulation.

11. The network simulation system of claim 1, wherein the bridge device is registered with the network simulation controller via the second ethernet hardware interface element.

12. The network simulation system of claim 1, wherein the trigger is provided to the bridge device via an Application Programming Interface (API) call provided by the network simulation controller.

13. A method comprising:

obtaining, by a network simulation controller, user inputs for configuring a bridge device interconnected with the network simulation controller for each of:

a serial hardware interface element that provides serial interconnectivity with one or more physical network devices;

an ethernet hardware interface element that provides ethernet connectivity with the one or more physical network devices; and a power distribution element that is to provide electrical power for the one or more physical network devices; and operating at least one physical network device of the one or more physical network devices within a virtual network simulation, wherein operating includes:

providing a trigger to the bridge device by the network simulation controller to power on the at least one physical network device of the one or more physical network devices; and based on the trigger, providing electrical power to the at least one physical network device of the one or more physical network devices by the bridge device via the power distribution element for operating the at least one physical network device within the virtual network simulation.

14. The method of claim 13, wherein operating the at least one physical network device of the one or more physical network devices further comprises: returning the at least one physical network device of the one or more physical network devices to a pool of available physical network devices when the at least one physical network device is removed from the virtual network simulation.

15. The method of claim 14, further comprising: providing a user interface display indication by the network simulation controller indicating that the at least one physical network device of the one or more physical network devices is available for inclusion in another virtual network simulation.

16. The method of claim 13, wherein operating the at least one physical network device of the one or more physical network devices further comprises:

obtaining one or more user inputs via a user interface provided by the network simulation controller to include the at least one physical network device of the one or more physical network devices in a virtual network simulation.

17. The method of claim 16, wherein operating the at least one physical network device of the one or more physical network devices further comprises:

removing the at least one physical network device of the one or more physical network devices from a pool of available physical network devices when the at least one physical network device is included in the virtual network simulation.

18. The method of claim 17, further comprising: providing a user interface display indication by the network simulation controller indicating that the at least one physical network device of the one or more physical network devices is unavailable for inclusion in another virtual network simulation.

19. The method of claim 13, wherein the trigger is provided to the bridge device via an Application Programming Interface (API) call provided by the network simulation controller.

20. The method of claim 13, wherein the bridge device is registered with the network simulation controller via another ethernet hardware interface element.

* * * * *